US012510853B2

(12) United States Patent
Konno

(10) Patent No.: US 12,510,853 B2
(45) Date of Patent: Dec. 30, 2025

(54) HEATING DEVICE, FIXING DEVICE, AND IMAGE FORMING APPARATUS

(71) Applicant: Yoshio Konno, Kanagawa (JP)

(72) Inventor: Yoshio Konno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 18/421,996

(22) Filed: Jan. 25, 2024

(65) Prior Publication Data

US 2024/0255874 A1 Aug. 1, 2024

(30) Foreign Application Priority Data

Jan. 27, 2023 (JP) ................................ 2023-011012

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01)

(58) Field of Classification Search
CPC ........... G03G 15/2017; G03G 15/2039; G03G 15/2042; G03G 15/2046; G03G 15/2053
See application file for complete search history.

(56) References Cited

U.S. PATENT DOCUMENTS

| | | | | |
|---|---|---|---|---|
| 6,385,410 B1 * | 5/2002 | Hanyu | ............... | G03G 15/2064 399/68 |
| 2011/0293341 A1 * | 12/2011 | Suzuki | ............... | G03G 15/2053 399/330 |

FOREIGN PATENT DOCUMENTS

| | | |
|---|---|---|
| JP | 59-169939 U | 11/1984 |
| JP | 2003-173122 A | 6/2003 |
| WO | 2015/093131 A1 | 6/2015 |

* cited by examiner

*Primary Examiner* — Thomas S Giampaolo, II
(74) *Attorney, Agent, or Firm* — XSENSUS LLP

(57) ABSTRACT

A heating device includes a roller and a pressure member. The roller includes a base body, a thermal capacitor, and a heater. The base body extends from a center portion to each end portions of the roller in a longitudinal direction of the roller. The thermal capacitor is disposed on each of the end portions of the roller. The thermal capacitor has a larger thermal capacity than the base body. The heater is disposed inside the base body to heat the base body. The pressure member faces the roller to press a recording medium against the roller.

5 Claims, 4 Drawing Sheets

COMPARATIVE EXAMPLE

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-011012, filed on Jan. 27, 2023, in the Japan Patent Office, the entire disclosure of which is hereby incorporated by reference herein.

BACKGROUND

Technical Field

Embodiments of the present disclosure relate to a heating device, a fixing device, and an image forming apparatus.

Related Art

A fixing device that serves as a heating device is known. Such a fixing device heats a recording medium such as a sheet of paper to fix an unfixed image on the recording medium to the recording medium.

In the fixing device, a fixing failure may occur and lead to a loss of an image when the temperature of a heating roller that serves as a roller is excessively low. Alternatively, when the temperature of the heating roller is excessively high, silicone rubber or toner wax components of a pressure roller as a pressure member may volatilize. Accordingly, ultrafine particles (UFPs) may be generated. For example, when small-size sheets continuously pass through the heating roller, the temperature of the heating roller may excessively increase. In such a case, the temperature of ends of the heating roller in the longitudinal direction may excessively increase.

A technology has been disclosed in which dust prevention members are disposed on ends of a pressure roller in the axial direction to reduce UFPs generated from the pressure roller.

SUMMARY

In an embodiment of the present disclosure, a heating device includes a roller, a heater, and a pressure member. The roller includes a base body and a thermal capacitor. The base body extends from a center portion to each end portions of the roller in a longitudinal direction of the roller. The thermal capacitor is disposed on each of the end portions of the roller. The thermal capacitor has a larger thermal capacity than the base body. The heater is disposed inside the base body to heat the base body. The pressure member faces the roller to press a recording medium against the roller.

In another embodiment of the present disclosure, a fixing device includes the heating device. The roller heats the recording medium on which an unfixed toner image is borne. The pressure member presses the recording medium against the roller to fix the unfixed toner image on the recording medium.

In still another embodiment of the present disclosure, an image forming apparatus includes the fixing device.

In still another embodiment of the present disclosure, a heating device includes a roller, a heater, and a pressure member. The roller includes a base body extending from a center portion to each end portions of the roller in a longitudinal direction of the roller. The base body has a recessed portion at the center portion. The recessed portion has a thickness smaller than the each of the end portions. The heater is disposed inside the base body to heat the base body. The pressure member faces the roller to press a recording medium against the roller.

In still another embodiment of the present disclosure, a heating device includes a roller, a heater, and a pressure member. The roller includes a base body. The base body includes a first portion and a second portion. The first portion is disposed at least on a center portion of the roller in a longitudinal direction of the roller. The second portion is disposed at least on each of the end portions of the roller in the longitudinal direction. The second portion has a thermal capacity larger than the first portion. The heater is disposed inside the base body to heat the base body. The pressure member faces the roller to press a recording medium against the roller.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
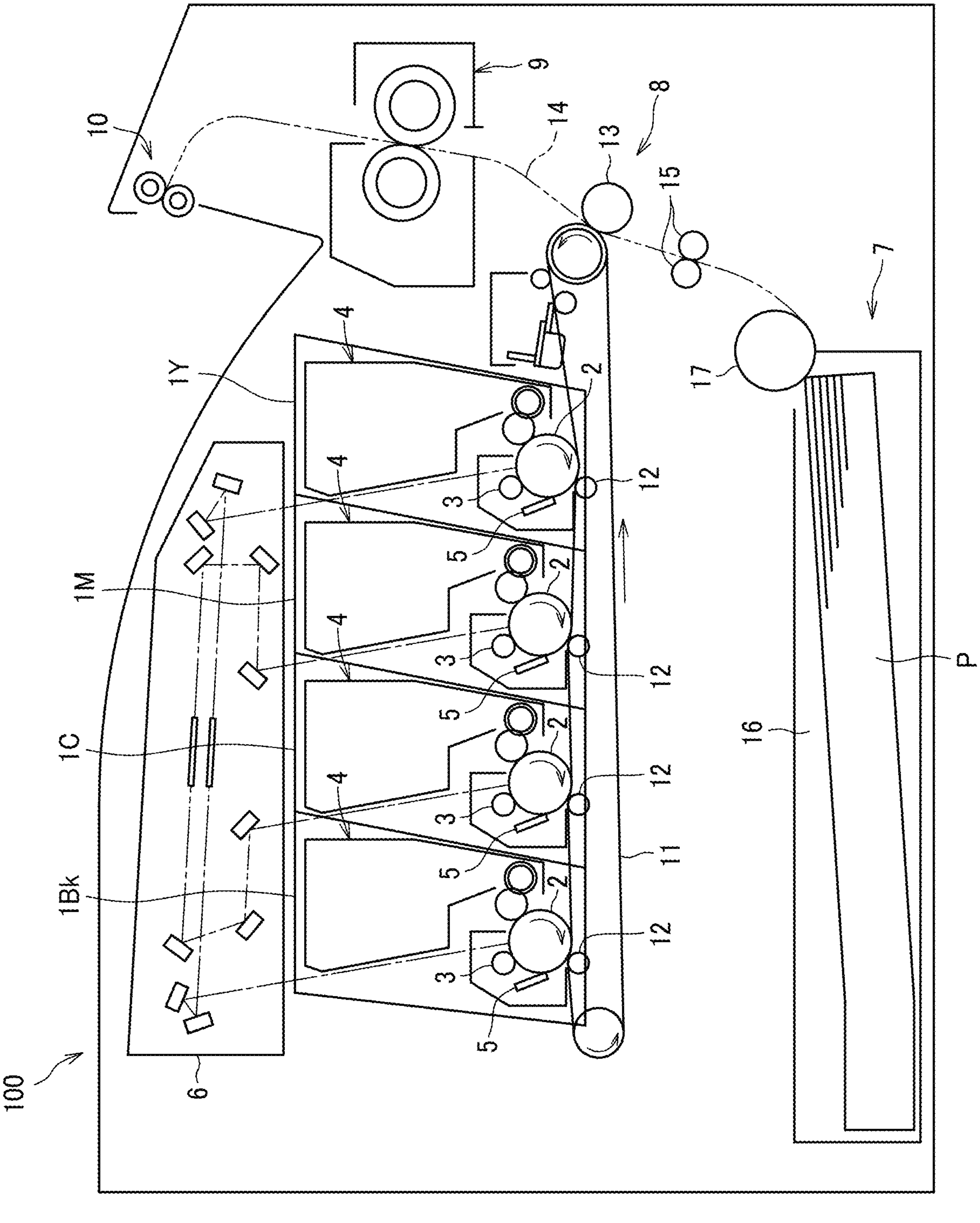
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like or equivalent components and overlapping description of those components may be simplified or omitted as appropriate. A fixing device that serves as a heating device according to an embodiment of the present disclosure, disposed in an image forming apparatus is described below.

FIG. 1 is a schematic cross-sectional view of an image forming apparatus 100 according to an embodiment of the present disclosure.

The image forming apparatus 100 illustrated in FIG. 1 includes four image forming devices 1Y, 1M, 1C, and 1Bk that are attachable to and detachable from a body of the image forming apparatus 100. The image forming devices 1Y, 1M, 1C, and 1Bk have a similar configuration except that the image forming devices 1Y, 1M, 1C, and 1Bk contain developers of different colors, i.e., yellow, magenta, cyan, and black, respectively. The above-described developers of colors of yellow, magenta, cyan, and black correspond to the respective color separation components of a color image. Each of the image forming devices 1Y, 1M, 1C, and 1Bk includes a drum-shaped photoconductor 2 as an image bearer, a charger 3, a developing device 4, and a cleaner 5. The charger 3 charges the surface of the photoconductor 2. The developing device 4 supplies toner as a developer to the surface of the photoconductor 2 to form a toner image. The cleaner 5 cleans the surface of the photoconductor 2.

The image forming apparatus 100 further includes an exposure device 6, a sheet feeder 7, a transfer device 8, a fixing device 9, and a sheet ejector 10. The exposure device 6 exposes the surfaces of the photoconductors 2 to form electrostatic latent images on the surfaces of the photoconductors 2. The sheet feeder 7 supplies a sheet P as a recording medium to a sheet conveyance path 14. The transfer device 8 transfers toner images formed on the photoconductors 2 to the sheet P. The fixing device 9 fixes the toner images transferred to the sheet P to the surface of the sheet P. The sheet ejector 10 ejects the sheet P outside the image forming apparatus 100. The image forming devices 1Y, 1M, 1C, and 1Bk, the photoconductors 2, the chargers 3, the exposure device 6, the transfer device 8 collectively serve as an image forming device for forming an image on a sheet P.

The transfer device 8 includes an endless intermediate transfer belt 11 as an intermediate transferor, four primary transfer rollers 12 as primary transferors, and a secondary transfer roller 13 as a secondary transferor. The intermediate transfer belt 11 is stretched by multiple rollers. The primary transfer rollers 12 transfer toner images on the photoconductors 2 to the intermediate transfer belt 11. The secondary transfer roller 13 transfers the toner images, which have been transferred to the intermediate transfer belt 11, to the sheet P. The primary transfer rollers 12 contact the respective photoconductors 2 with the intermediate transfer belt 11 interposed between the primary transfer rollers 12 and the respective photoconductors 2. Accordingly, the intermediate transfer belt 11 and the photoconductors 2 contact each other, and primary transfer nips are formed between the intermediate transfer belt 11 and the photoconductors 2. The secondary transfer roller 13 contacts one of the rollers that stretch the intermediate transfer belt 11 via the intermediate transfer belt 11. Accordingly, a secondary transfer nip is formed between the secondary transfer roller 13 and the intermediate transfer belt 11.

A timing roller pair 15 is disposed on the sheet conveyance path 14 between the sheet feeder 7 and the secondary transfer nip formed between the secondary transfer roller 13 and the intermediate transfer belt 11.

Next, a printing operation of the image forming apparatus 100 is described with reference to FIG. 1.

When the start of the printing operation is instructed, the photoconductors 2 are rotated clockwise in FIG. 1 in the respective image forming devices 1Y, 1M, 1C, and 1Bk. Accordingly, the surfaces of the photoconductors 2 are uniformly charged to a high potential by the respective chargers 3. Next, the exposure device 6 exposes the surfaces of the photoconductors 2 based on image data of a document read by a document reader or print data instructed to be printed from a terminal. As a result, the potential of portions of the surfaces of the photoconductors 2 exposed by the exposure device 6 decreases. Accordingly, an electrostatic latent image is formed on each of the surfaces of the photoconductors 2. Subsequently, each of the developing devices 4 supplies toner to the corresponding one of the photoconductors 2 on which the electrostatic latent image has been formed. Accordingly, a toner image is formed on each of the photoconductors 2.

The toner images that are formed on the photoconductors 2 rotate with the rotation of the photoconductors 2 and reach the respective primary transfer nips at the position of corresponding one of the primary transfer rollers 12. The toner images are transferred to the intermediate transfer belt 11, which is driven to rotate counterclockwise in FIG. 1, to be sequentially superimposed on one on another to form a full-color toner image. The full-color toner image that has been transferred to the intermediate transfer belt 11 is conveyed to the secondary transfer nip at a position at which the secondary transfer roller 13 is disposed in accordance with the rotation of the intermediate transfer belt 11. The full-color toner image is transferred to a sheet P at the secondary transfer nip to which the sheet P has been conveyed. The sheet P that has been conveyed to the secondary transfer nip is supplied from the sheet feeder 7. The timing roller pair 15 temporarily halts the sheet P supplied from the sheet feeder 7. Subsequently, the timing roller pair 15 conveys the sheet P to the secondary transfer nip such that the sheet P reaches the secondary transfer nip when the full-color toner image reaches the secondary transfer nip. Accordingly, the full-color toner image is borne on the sheet P. After the toner images have been transferred to the intermediate transfer belt 11, the cleaning devices 5 remove residual toner on the respective photoconductors 2.

The sheet P to which the full-color toner image has been transferred is conveyed to the fixing device 9, and the fixing device 9 fixes the full-color toner image on the sheet P. Subsequently, the sheet ejector 10 ejects the sheet P outside the image forming apparatus 100. Thus, a series of printing operations is completed.

Next, the configuration of the fixing device 9 is described with reference to FIGS. 2 and 3.

Figure 2:
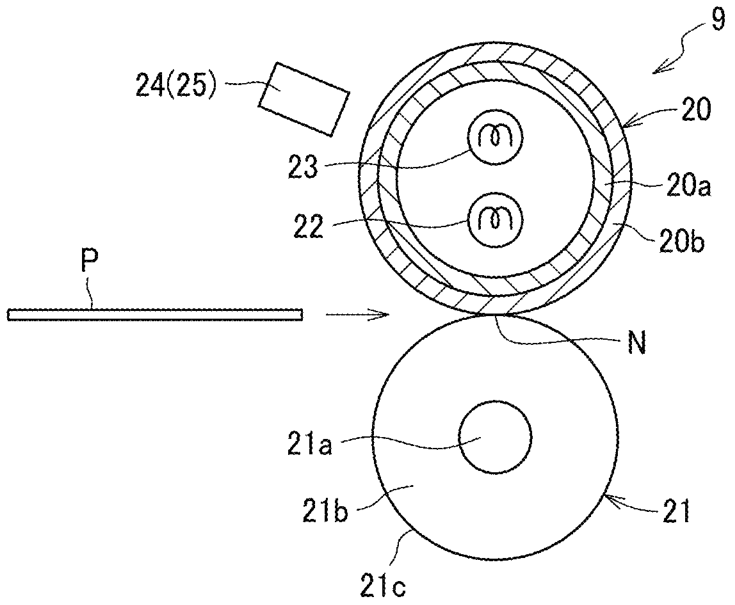
FIG. 2 is a side cross-sectional view of a fixing device according to an embodiment of the present disclosure.

As illustrated in FIG. 2, the fixing device 9 includes a heating roller 20 as a roller, a pressure roller 21 as a pressure member, a center-side heater 22 as a center-side heater, an end-side heater 23 as an end-side heater, a center-side thermistor 24 as a center-side temperature detector, and an end-side thermistor 25 as an end-side temperature detector. The heating roller 20, the pressure roller 21, the center-side heater 22, and the end-side heater 23 extend in a lateral direction indicated by double-headed arrow X in FIG. 3, which is a direction orthogonal to the sheet surface of FIG. 2. The lateral direction indicated by the double-headed arrow X is a longitudinal direction of the fixing device 9, the heating roller 20, the pressure roller 21, the center-side heater 22, and the end-side heater 23. The lateral direction indicated by the double-headed arrow X is also a width direction of the sheet P orthogonal to an axis direction in which the heating roller 20 and the pressure roller 21 rotate or a conveyance direction of the sheet P passing through the fixing device 9.

The heating roller 20 is a hollow cylindrical member. As illustrated in FIG. 3, the heating roller 20 of the present embodiment includes a base pipe 20*a* as a base body, a surface layer 20*b*, and large thermal capacitors 20*c* as thermal-capacity absorbers and releasers. The base pipe 20*a* and the surface layer 20*b* are disposed from one end to the other end of the heating roller 20 in the longitudinal direction.

The base pipe 20*a* has a hollow cylindrical shape. The base pipe 20*a* is formed of, for example, aluminum, steel, stainless steel. The base pipe 20*a* of the present embodiment is formed of aluminum. The surface layer 20*b* is formed on the outer peripheral surface of the base pipe 20*a* to improve the releasability of the sheet P. Teflon (registered trademark) is coated on the outer peripheral surface of the base pipe 20*a* to form the surface layer 20*b* of the present embodiment. The surface layer 20*b* may be formed of a polyimide film.

The large thermal capacitors 20*c* are formed of a material having a larger thermal capacity than the base pipe 20*a*. Each of the large thermal capacitors 20*c* is disposed only on an end portion of the heating roller 20 in the longitudinal direction. In the present embodiment, end portions of the base pipe 20*a* in the longitudinal direction are replaced with the large thermal capacitors 20*c*. In other words, the base pipe 20*a* includes recessed portions than a central portion of the base pipe 20*a* in the longitudinal direction in ends of the base pipe 20*a*. Each of the large thermal capacitors 20*c* are disposed on corresponding one of the recessed portions on the ends of the base pipe 20*a*. Accordingly, the thickness of a central portion of the heating roller 20 and the thickness of end portions of the heating roller 20 in the longitudinal direction are substantially the same. However, the thickness of the base pipe 20*a* may be uniform in the longitudinal direction, and the thickness of the end portions of the heating roller 20 in the longitudinal direction may be larger by the thickness of the large thermal capacitors 20*c*. The large thermal capacitor 20*c* may be disposed over a partial region on a center portion of the large thermal capacitors 20*c* in the longitudinal direction. In the present embodiment, the end portions of the heating roller 20 in the longitudinal direction are both end portions of equal thirds when the heating roller 20 is divided into the equal thirds in the longitudinal direction. The center portion of the heating roller 20 in the longitudinal direction is a center portion of the equal thirds.

The pressure roller 21 includes a solid metal core 21*a*, an elastic layer 21*b* formed on the surface of the metal core 21*a*, and a release layer 21*c* formed around the elastic layer 21*c*. The elastic layer 21*b* is formed of silicon rubber. The surface of the elastic layer 21*b* is preferably covered with the release layer 21*c* to enhance the releasability of the elastic layer 21*b*.

A fixing nip N is formed between the heating roller 20 and the pressure roller 21. The center-side heater 22 and the end-side heater 23 are disposed inside the heating roller 20. The center-side heater 22 and the end-side heater 23 are halogen heaters. As illustrated in FIG. 3, the center-side heater 22 includes a densely-wound portion 22*a* in which a filament is densely wound in a center portion of the center-side heater 22 in the longitudinal direction, and loosely-wound portions 22*b* in which the filament is loosely wound in end portions of the center-side heater 22. By contrast, the end-side heater 23 includes a loosely-wound portion 23*b* in a center portion of the end-side heater 23 in the longitudinal direction and densely-wound portions 23*a* on both end portions of the end-side heater 23 in the longitudinal direction. As described above, the multiple heaters, i.e., the center-side heater 22 and the end-side heater 23 that typically heat different areas are disposed. By so doing, the temperature of the end portions of the heating roller 20 can be prevented from increasing, as described below. However, the fixing device 9 may include a single heater. The center-side heater 22 and the end-side heater 23 may be, for example, an induction heating (IH) coil heater, a resistance heater, or a carbon heater.

The center-side thermistor 24 is disposed at a position facing the outer circumferential surface of the center portion of the heating roller 20 in the longitudinal direction, to detect the temperature of the center portion of the heating roller 20. The end-side thermistor 25 is disposed at a position facing the outer circumferential surface of one of the end portions of the heating roller 20 in the longitudinal direction, to detect the temperature of the end portion of the heating roller 20.

In the fixing device 9 according to the present embodiment, when the printing operation is started, the pressure roller 21 is driven to rotate, and the heating roller 20 starts to be rotated. The center-side heater 22 or the end-side heater 23 are energized. Accordingly, the heating roller 20 is heated. When the temperature of the heating roller 20 reaches a fixing temperature which is a predetermined target temperature, a sheet P on which an unfixed toner image is borne is conveyed to the fixing nip N between the heating roller 20 and the pressure roller 21. By so doing, the unfixed toner image is heated and pressurized to be fixed on the sheet P.

In the present embodiment, the center-side heater 22 and the end-side heater 23 that heat the center portion and the end portions, respectively, of the heating roller 20 in the longitudinal direction, are independently disposed. Accordingly, independently adjusting the amounts of heat generation of the center-side heater 22 and the end-side heater 23 allows the temperatures of the center portion and the end portions of the heating roller 20 to be adjusted. At this time, the center-side thermistor 24 and the end-side thermistor 25 are disposed at positions facing the center portion and the end portion, respectively, of the heating roller 20 in the longitudinal direction. By so doing, the amount of heat generation of the center-side heater 22 and the end-side heater 23 can be adjusted based on the temperatures detected by the center-side thermistor 24 and the end-side thermistors 25, respectively.

In the present embodiment, a sheet P is heated and pressurized at the fixing nip N between the heating roller 20 as the roller and the pressing roller 21 as the pressing member. In such a configuration, when the temperature of the heating roller 20 is excessively low, the toner on the sheet P is not sufficiently melted and is less likely to be fixed to the sheet P. Accordingly, a fixing failure may occur which may lead to a loss of an image. Alternatively, when the temperature of the heating roller 20 is excessively high, fine particles may be generated from the elastic layer 21*b* of the pressure roller 21, which slides on the heating roller 20, and wax components of the toner. The fine particles are ultrafine particles, which may also be referred to simply as UFPs in the following description, to be measured by an experiment illustrated in FIG. 6 below.

In particular, the excessive rise of the temperature of the heating roller 20 may be caused by the rise of the temperature of the end portions of the heating roller 20 when small-sized sheets P continuously pass through. In other words, when small-size sheets P continuously pass through, heat is taken away by the sheets P in a region in which the sheets P have passed through. Alternatively, heat is not taken away by the sheets P in a region in which the sheets P do not pass through and the temperature continues to rise in the region. Accordingly, the temperature of the end portions of the heating roller 20 in the longitudinal direction may excessively rise.

With respect to the above-described disadvantages, in the present embodiment, the end portions of the heating roller 20 in the longitudinal direction have a larger thermal capacity than the center portion of the heating roller 20. Specifically, the end portions of the heating roller 20 in the longitudinal direction have the larger thermal capacity than the center portion of the heating roller 20 in the longitudinal direction by the thermal capacity of the large thermal capacitors 20*c*. The end portions of the heating roller 20 in the longitudinal direction have the larger thermal capacity than the center portion of the heating roller 20 in the longitudinal direction means that, for example, the average value of the thermal capacity per unit length of the end portions of the heating roller 20 in the longitudinal direction is larger than the average value of the thermal capacity of the center portion of the heating roller 20.

The thermal capacity of the end portions of the heating roller 20 in the longitudinal direction is larger than the thermal capacity of the center portion of the heating roller 20 in the longitudinal direction. Such a configuration as described above causes the temperature change of the end portions of the heating roller 20 in the longitudinal direction to be smaller than the temperature change of the center portion of the heating roller 20. Such a configuration as described above can prevent the temperature of the end portions of the heating roller 20 in the longitudinal direction from excessively increasing when small-size sheets P are continuously passed through. At the same time, the temperature of the end portions of the heating roller 20 in the longitudinal direction can be prevented from being excessively low. In other words, the temperature of the heating roller 20 can be maintained within an appropriate range.

Next, an experiment was conducted to examine the relation between the temperature increase of silicone oil and fluorine grease, which are employed as lubricants, and the concentration of UFPs, i.e., the number of UFPs generated per 1 $cm^3$, generated from the above-described lubricants. The results of the experiment are illustrated in FIG. 6.

In the experiment, petri dishes that contain the above-described lubricants were placed on a hotplate and heated to 250° C. in a test equipment of a laboratory certified by a German environmental label "Blue Angel Mark". The test equipment has a chamber volume of 1 m3 and ventilation was performed five times in the test equipment. The concentration of the UFPs in the test equipment was measured with a model 3091 Fast Mobility Particle Sizer, manufactured by FMPS Tokyo Dylec Co., Ltd., while monitoring the temperature of the hot plate. The weights and the types of the lubricants employed in the experiment were 70 mg of the fluorine-containing grease A, 70 mg of the fluorine-containing grease B, and 35 mg of the silicone oil.

Figure 6:
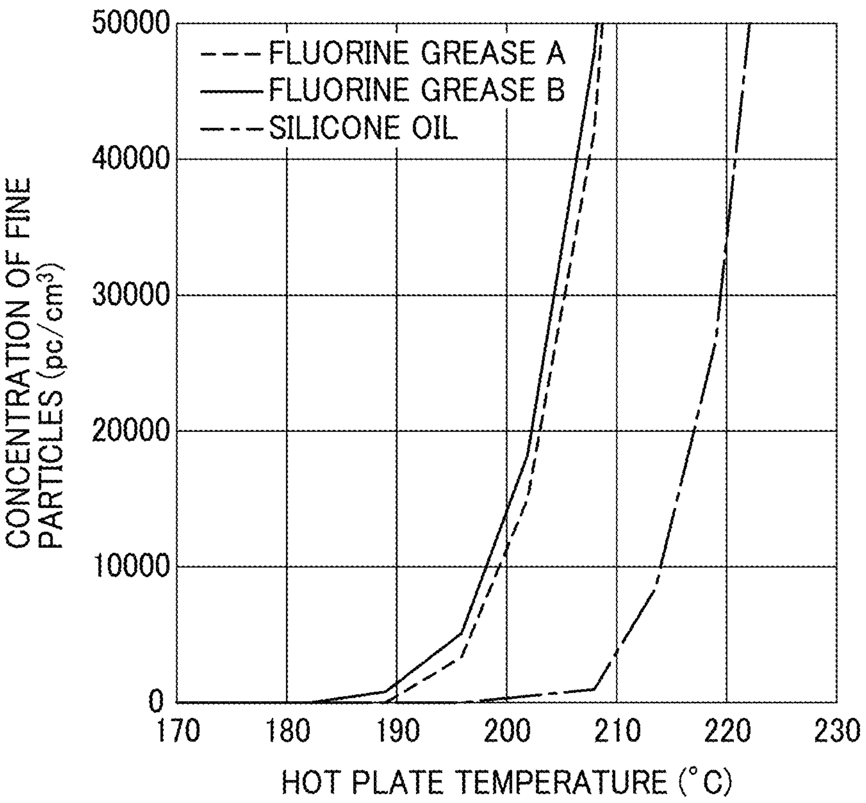
FIG. 6 is a graph illustrating the relation between the temperature of silicone oil and the concentration of generated fine particles, according to an embodiment of the present disclosure.

As illustrated in FIG. 6, in cases of the fluorine grease A and the fluorine grease B, the UFPs started to be generated from 185° C., and the concentration of the UFPs instantaneously increased from the vicinity of 195° C. Alternatively, in the case of the silicone oil, the UFPs started to be generated little by little from around a temperature exceeding 200° C., and the concentration of the UFPs instantaneously increased from a temperature of about 210° C.

As described above, in a fixing device that can reach a temperature exceeding 195° C., the above-described lubricants may be cooled by the atmosphere after being volatilized. Accordingly, the lubricants may be aggregated to generate the UFPs. For this reason, preferably, the temperature of portions of the heating roller 20 in which the UFPs are likely to be generated, is prevented from increasing to effectively reduce such UFPs.

Figure 7:
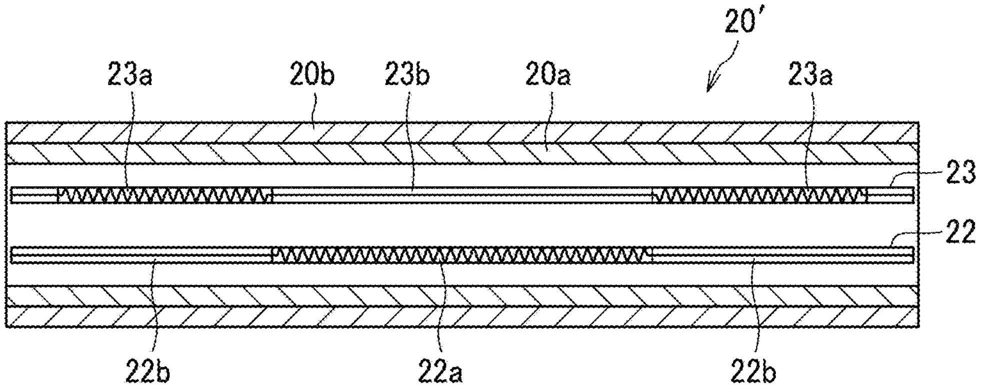
FIG. 7 is a cross-sectional view of a heating roller according to an embodiment different from the above embodiments of the present disclosure.

Next, a heating roller 20' according to a comparative example, having a configuration different from the configuration of the heating roller 20 of the above-described embodiments, is described with reference to FIG. 7. As illustrated in FIG. 7, the heating roller 20' is different from the heating roller 20 in that the heating roller 20' does not include the large thermal capacitors 20*c*. In other words, the thermal capacity of a center portion of the heating roller 20' and the thermal capacity of end portions of the heating roller 20' in the longitudinal direction are substantially equal.

Figure 3:
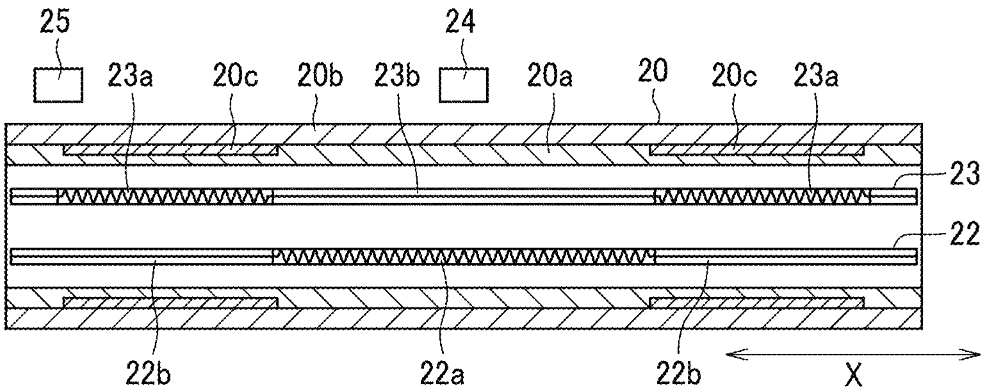
FIG. 3 is a cross-sectional view of a heating roller illustrating an internal configuration of the heating roller, according to an embodiment of the present disclosure.
Figure 8:
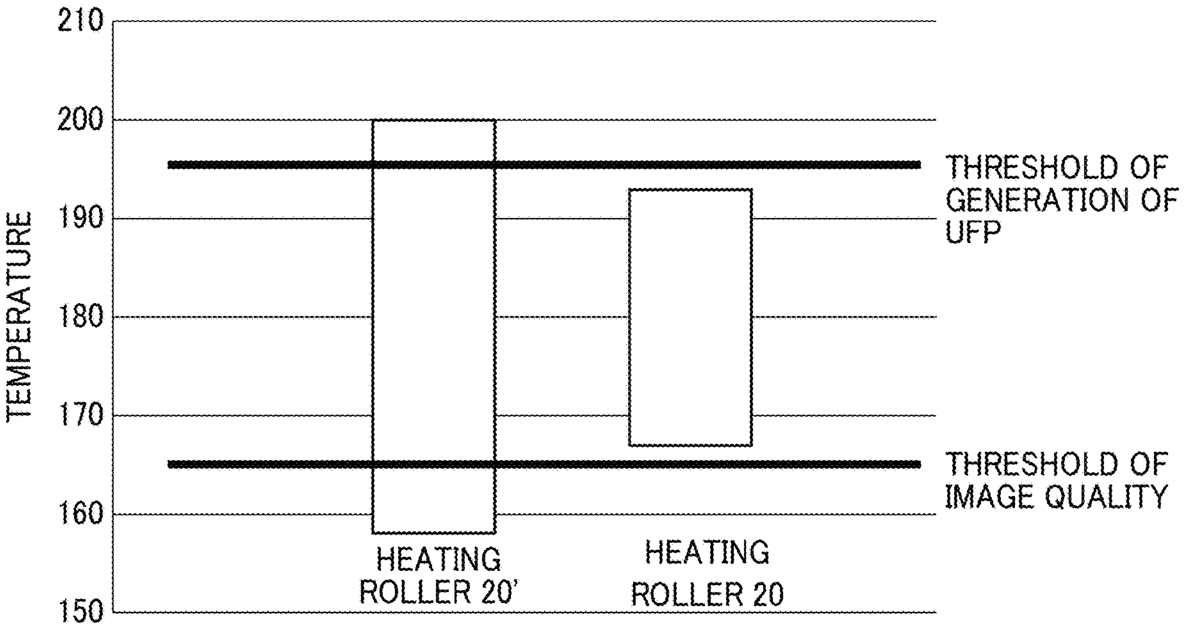
FIG. 8 is a graph illustrating results of an experiment on a range of temperature change of heating rollers, according to embodiments of the present disclosure.

FIG. 8 is a graph illustrating results of an experiment on ranges of the temperature change of the heating roller 20' of FIG. 7, according to the comparative example and the heating roller 20 of FIG. 3, according to the above-described embodiments. A bar in the left side of the graph illustrates a range of the temperature change of the heating roller 20' when the fixing device 9 including the heating roller 20' is operated. A bar in the right side of the graph illustrates a range of the temperature change of the heating roller 20 when the fixing device 9 including the heating roller 20 is operated.

As illustrated in FIG. 8, the temperature of the heating roller 20' of the comparative example may exceed 195° C., and the UFPs are generated when the temperature of the heating roller 20' exceeds 195° C. In addition, the temperature of the heating roller 20' may be lower than 165° C., and image defects due to fixing failure may occur. In contrast, the temperature change of the heating roller 20 of the above-described embodiments is within a range higher than 165° C. and lower than 195° C. Accordingly, the above-described disadvantages do not occur. As described above, for example, the large thermal capacitors 20*c* are provided for the heating roller 20 to increase the thermal capacity of the end portions of the heating roller 20 in the longitudinal direction. By so doing, the temperature change of the heating roller 20 can be reduced.

Next, the heating roller 20 that includes thermal-capacity absorbers and releasers different from the thermal-capacity absorbers and releasers, i.e., the large thermal capacitors 20*c*, of the above-described embodiments, is described in order.

Figure 4:
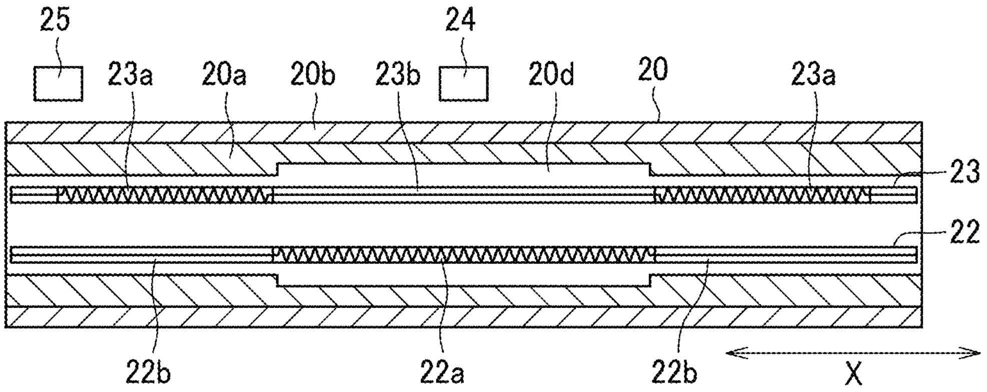
FIG. 4 is a cross-sectional view of a heating roller according to another embodiment of the present disclosure.

As illustrated in FIG. 4, the heating roller 20 of the present embodiment includes a base pipe 20*a* and a surface layer 20*b*. The base pipe 20*a* includes a cut-out portion 20*d*, which serves as a thermal-capacity absorber and releaser, in a center portion of the base pipe 20*a* in the longitudinal direction. The cut-out portion 20*d* is disposed such that the center portion of the base pipe 20*a* in the longitudinal direction is more recessed than end portions of the base pipe 20*a* in the longitudinal direction. Such a configuration as described above allows the thermal capacity of the end portions of the heating roller 20 to be larger than the thermal capacity of the center portion of the heating roller 20. In addition, a center portion of the surface layer 20*b* may be more recessed than end portions of the surface layer 20*b* in the longitudinal direction.

Figure 5:
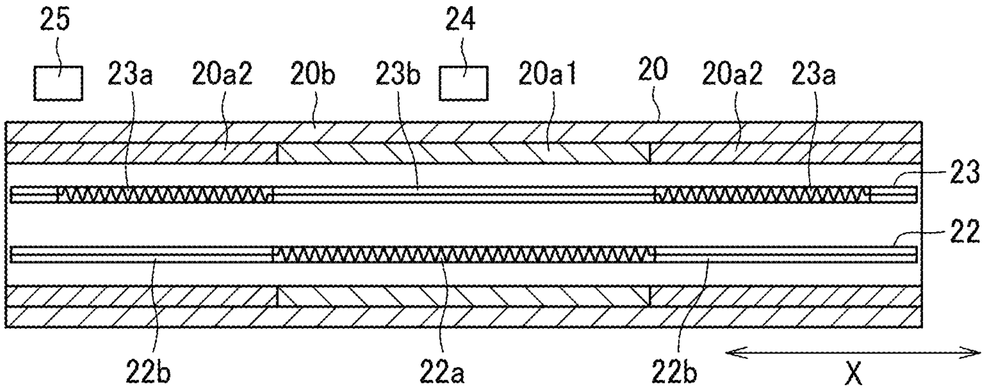
FIG. 5 is a sectional view of a heating roller according to still another embodiment of the present disclosure.

The heating roller 20 according to an embodiment illustrated in FIG. 5, includes a base pipe, which includes a first portion 20*a*1 and second portions 20*a*2. The first portion 20*a*1 is disposed in a center portion of the base pipe in the longitudinal direction. The second portions 20*a*2 serve as thermal-capacity absorbers and releasers. Each of the second portions 20*a*2 is disposed on an end of the base pipe in the longitudinal direction and formed of a material having a larger thermal capacity than the first portion 20*a*1. Such a configuration as described above allows the thermal capacity of the end portions of the heating roller 20 to be larger than the thermal capacity of the center portion of the heating roller 20. The first portion 20*a*1 may be disposed at least in the center portion of the base pipe in the longitudinal direction. The first portion 20*a*1 may also overlap portions of the end portions of the base pipe. Each of the second portion 20*a*2 may be disposed at least in the corresponding one of the end portions of the base pipe in the longitudinal direction. Each of the second portions 20*a*2 may also overlap a portion of the center portion of the base pipe.

In the embodiments illustrated in FIGS. 4 and 5 also, the end portions of the heating roller 20 in the longitudinal direction have a larger thermal capacity than the center portion of the heating roller 20. By so doing, the temperature of the heating roller 20 can be prevented from excessively increasing and decreasing. Accordingly, the temperature of the heating roller 20 can be maintained within an appropriate range.

Embodiments of the present disclosure have been described as above. However, embodiments of the present disclosure are not limited to the embodiments described above, and various modifications and enhancements are possible without departing from the gist of the present disclosure.

An image forming apparatus according to embodiments of the present disclosure is not limited to a color image forming apparatus as illustrated in FIG. 1 and may be, for example, a monochrome image forming apparatus, a copier, a printer, a facsimile, or a multifunction peripheral including at least two functions of the copier, printer, and facsimile machine.

The above-described embodiments of the present disclosure are not limited to the fixing devices described in the above embodiments. However, the embodiments of the present disclosure are also applicable to, for example, a heating device such as a dryer to dry ink applied to a sheet, a coating device such as a laminator that heats, under pressure, a film serving as a covering member onto the surface of a sheet such as a sheet of paper, and a thermocompression device such as a heat sealer that seals a seal portion of a packaging material with heat and pressure. The embodiments of the present disclosure can be applied to such apparatuses as described above. By so doing, the temperature of end portions of a roller in the longitudinal direction can be appropriately maintained.

Examples of recording medium include, in addition to a sheet of paper such as plain paper, thick paper, a postcard, an envelope, plain paper, thin paper, coated paper, art paper, tracing paper, an overhead projector (OHP) sheet, plastic film, prepreg, or copper foil.

Aspects of the present disclosure are, for example, as follows.

First Aspect

A heating device includes a roller and a pressure member. The roller includes a base body, a thermal capacitor, and a heater. The base body extends from a center portion to each end portions of the roller in a longitudinal direction of the roller. The thermal capacitor is disposed on each of the end portions of the roller. The thermal capacitor has a larger thermal capacity than the base body. The heater is disposed inside the base body to heat the base body. The pressure member faces the roller to press a recording medium against the roller.

Second Aspect

In the heating device according to the first aspect, the base body includes a recessed portion at each of the end portions. The recessed portion has thicknesses smaller than the center portion. The thermal capacitor is disposed on the recessed portion.

Third Aspect

The heating device according to the first aspect, further includes a first detector and a second detector. The first detector faces the center portion of the roller in the longitudinal direction to detect the temperature of the center portion of the roller. The second detector faces at least one of the end portions of the roller in the longitudinal direction to detect the temperature of the end portions of the roller. The heater includes a first heater and second heaters. The first heater heats the center portion of the roller. The second heaters respectively heat the end portions of the roller.

Fourth Aspect

A fixing device includes the heating device according to the first aspect. The roller heats the recording medium on which an unfixed toner image is borne. The pressure member presses the recording medium against the roller to fix the unfixed toner image on the recording medium.

Fifth Aspect

An image forming apparatus includes the fixing device according to the sixth aspect.

Sixth Aspect

A heating device includes a roller and a pressure member. The roller includes a base body and a heater. The base body extends from a center portion to each end portions of the roller in a longitudinal direction of the roller. The base body has a recessed portion at the center portion. The recessed portion has a thickness smaller than each of the end portions. The heater is disposed inside the base body to heat the base body. The pressure member faces the roller to press a recording medium against the roller.

Seventh Aspect

A heating device includes a roller, a heater, and a pressure member. The base body includes a first portion and a second portion. The first portion is disposed on a center portion of the roller in a longitudinal direction of the roller. The second portion is disposed on each end portions of the roller in the longitudinal direction. The second portion has a thermal capacity larger than the first portion. The heater is disposed inside the roller to heat the roller. The pressure member faces the roller to press a recording medium against the roller.

The invention claimed is:

1. A heating device, comprising:

a roller including:

a base body comprising a first material, wherein the base body extends from a first end portion through a center portion and to a second end portion of the roller in a longitudinal direction of the roller, the first end portion includes a first recessed portion, the second end portion includes a second recessed portion, and the first end portion and the second end portion have a thickness smaller than a thickness of the center portion;

a first thermal capacitor on the first recessed portion;

a second thermal capacitor on the second recessed portion, wherein the first thermal capacitor and the second thermal capacitor each comprise a second material having a larger thermal capacity than the first material of the base body; and a heater inside the base body to heat the base body; and a pressure roller facing the roller to press a recording medium against the roller.

2. The heating device according to claim 1, further comprising:

a first detector facing the center portion of the roller in the longitudinal direction, to detect a temperature of the center portion of the roller; and a second detector facing the first end portion of the roller in the longitudinal direction to detect a temperature of the first end portion of the roller, wherein the heater includes:

a first heater to heat the center portion of the roller;

a second heater to heat the first end portion of the roller; and a third heater to heat the second end portion of the roller.

3. A fixing device, comprising:

the heating device according to claim 1, wherein the roller heats the recording medium on which an unfixed toner image is borne, and the pressure roller presses the recording medium against the roller to fix the unfixed toner image on the recording medium.

4. An image forming apparatus comprising the fixing device according to claim 3.

5. A heating device, comprising:

a roller including a roller body, wherein:

the roller body includes a first portion and a second portion;

the first portion comprises a first material, the first portion on a center portion of the roller body in a longitudinal direction of the roller; and the second portion comprises a second material, the second portion is on each of first and second end portions of the roller body in the longitudinal direction, and the second material having a thermal capacity larger than the first material;

a heater inside the roller to heat the roller; and a pressure roller facing the roller to press a recording medium against the roller.

* * * * *